US009514224B2

(12) United States Patent
Barrand

(10) Patent No.: US 9,514,224 B2
(45) Date of Patent: *Dec. 6, 2016

(54) SYSTEMS AND METHODS FOR SHARING AUDIO FEEDS

(71) Applicant: AOL Inc., Dulles, VA (US)

(72) Inventor: Bryce Barrand, Ashburn, VA (US)

(73) Assignee: AOL Inc., Dulles, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/736,461

(22) Filed: Jun. 11, 2015

(65) Prior Publication Data

US 2015/0278352 A1    Oct. 1, 2015

Related U.S. Application Data

(63) Continuation of application No. 13/794,185, filed on Mar. 11, 2013, now Pat. No. 9,083,674.

(51) Int. Cl.
| | | |
|---|---|---|
| G06F 15/16 | (2006.01) | |
| G06F 17/30 | (2006.01) | |
| H04L 29/08 | (2006.01) | |
| H04L 29/06 | (2006.01) | |

(52) U.S. Cl.
CPC ... *G06F 17/30755* (2013.01); *G06F 17/30778* (2013.01); *G06F 17/30861* (2013.01); *G06F 17/30887* (2013.01); *H04L 29/06448* (2013.01); *H04L 65/403* (2013.01); *H04L 67/02* (2013.01); *H04L 67/10* (2013.01)

(58) Field of Classification Search
CPC ... H04L 29/06176; H04L 29/06448–29/06455; H04L 12/18; G06F 17/30861–17/30876
See application file for complete search history.

(56) References Cited

U.S. PATENT DOCUMENTS

| | | | |
|---|---|---|---|
| 2006/0120385 A1 | 6/2006 | Atchison et al. | |
| 2006/0190616 A1 | 8/2006 | Mayerhofer et al. | |
| 2007/0130594 A1 | 6/2007 | Hidary et al. | |
| 2008/0263103 A1 | 10/2008 | McGregor et al. | |
| 2009/0177989 A1 | 7/2009 | Ma et al. | |
| 2011/0111773 A1 | 5/2011 | Lee et al. | |

OTHER PUBLICATIONS

International Preliminary Report on Patentability issued in corresponding International Application No. PCT/US2014/022647, mailed Sep. 24, 2015.
International Search Report and Written Opinion issued in corresponding International Application No. PCT/US2014/022647, mailed Jul. 7, 2014.

*Primary Examiner* — Brendan Higa
(74) *Attorney, Agent, or Firm* — Bookoff McAndrews, PLLC

(57) ABSTRACT

Systems and methods are disclosed for enabling sharing of audio feeds. One method includes receiving, from a user over a network, a request to add an audio feed to a collection managed by the user; storing, in a database, a URL of the audio feed in relation to the collection; receiving, from the user over the network, a request to share the collection; and generating an RSS URL of the collection by searching the database for URLs of audio feeds stored in relation to the collection.

20 Claims, 6 Drawing Sheets

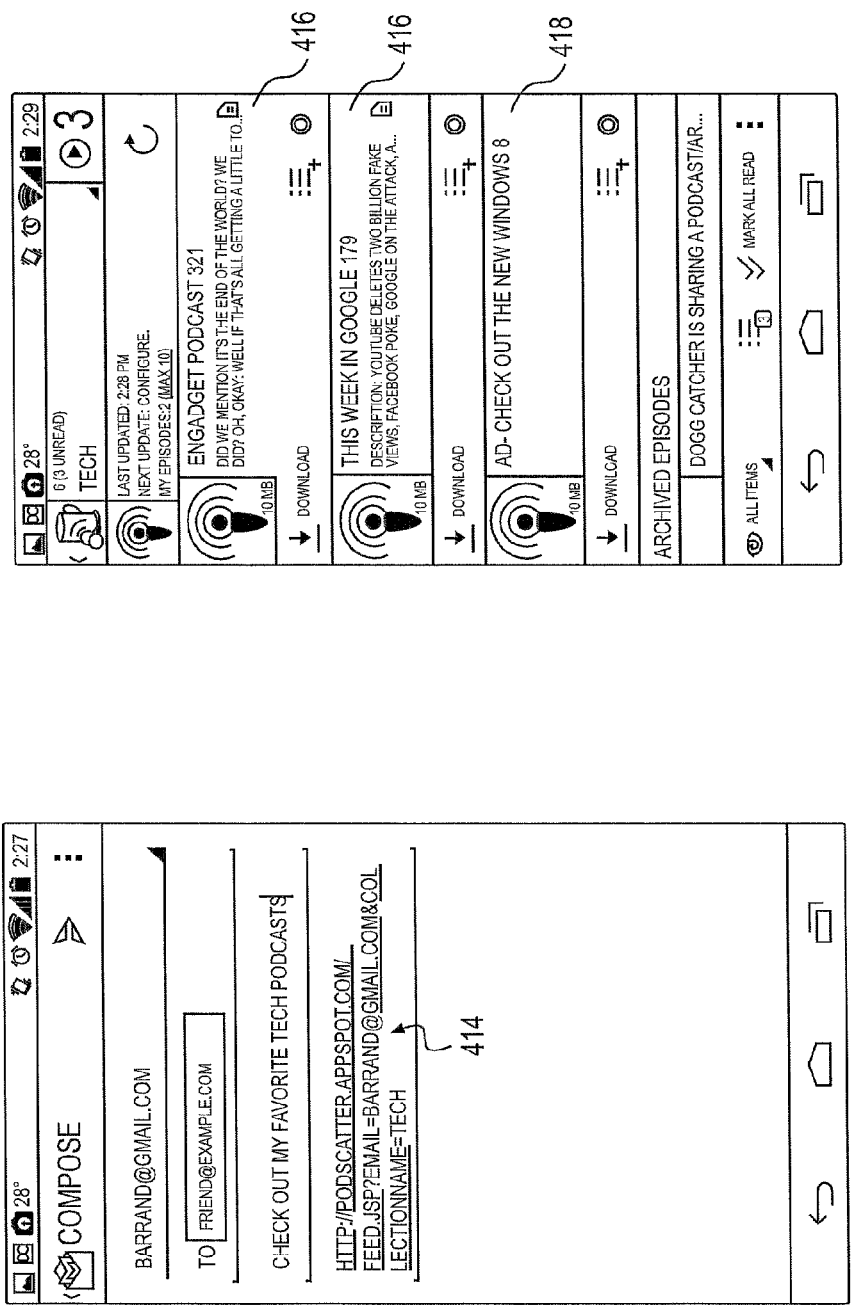

SYSTEMS AND METHODS FOR SHARING AUDIO FEEDS

CROSS-REFERENCE TO RELATED APPLICATION

This application is a continuation of pending U.S. application Ser. No. 13/794,185, filed Mar. 11, 2013, which is hereby incorporated herein by reference in its entirety.

TECHNICAL FIELD

Various embodiments of the present disclosure relate generally to collecting and sharing electronic content. More specifically, exemplary embodiments of the present disclosure relate to systems and methods for collecting and sharing audio feeds, such as RSS feeds and podcasts.

BACKGROUND

RSS (Really Simple Syndication) is a popular format for distributing content from one or more websites for collection and display on another website or page, computer program, or mobile device. RSS feeds create a list of updates that contain titles, short descriptions, and hyperlinks to longer articles or Web pages, as well as a reference linked back to the originating site. Rather than constantly visiting websites to check for new information, users can simply subscribe to various information sources in an RSS feed, which then delivers new content to the user automatically, allowing the user to aggregate content and stay updated with minimal effort. When RSS code includes an "enclosure" that is an audio file, it is often referred to as a "podcast."

Recently, audio files such as songs, news reports, and entertainment/opinion are increasingly distributed as podcasts. The word "podcast" is a neologism of the words "broadcast" and "pod" (a reference to the successful portable media players). Podcasts are typically an episodic series of audio or video files that users can subscribe to and download to a computer or mobile device through web syndication or online streaming. Often, a news or entertainment source will periodically generate an audio or video file, and add it to a podcast so that subscribers to the podcast will be updated with the newly generated audio or video file. Typically, a list of all of the audio or video files associated with a particular series or podcast is maintained on the content distributor's server as a web feed (such as an RSS feed). Users can then use special client application software, known as a "podcatcher," to access the web feed for updates and download any audio or video files newly published in the series. Because the files are downloaded, the user can store them on his or her computer or mobile device for offline use, enabling continued and flexible access to the audio or video file.

Because podcasts have become such a popular and easy-to-use method for distributing rich media content, users increasingly desire to share podcasts with their family, friends, and colleagues in an advanced and flexible way. Currently, however, options for sharing podcasts are severely limited. To share a single podcast, a user must copy and paste a link to the podcast (i.e., the URL of the podcast) and then send the link to the podcast to one or more contacts using traditional means, such as e-mail, SMS, etc. Certain podcatchers might build in simple mechanisms that automatically call up an e-mail or SMS client for this purpose, but they still rely on tediously sending a link for a particular podcast. Some podcatchers also make it possible to send contacts an entire list of podcasts that the contact can then subscribe to. However, again, this method involves nothing more than generating a list of links to each podcast the user desires to share. The method then involves sending the list of links to a contact, for example, as an e-mail attachment. As a result, a recipient of the shared list of files must import all of the podcast links into the user's podcatcher, or individually copy and paste each podcast link into the user's podcatcher client, so as to individually subscribe to each shared podcast.

These existing techniques for sharing podcasts suffer from many drawbacks. First of all, the process of copying and pasting podcast links is tedious and cumbersome. If a user desired to share a playlist of related podcasts from different publishers, the user must copy and paste each podcast URL for sending to the user's contact, and the recipient must individually subscribe to each received podcast URL. Second, the process is static. That is, once a user shares a list of podcast URLs with the user's contact, the process has ended, until the user manually updates his or her contact with a recommendation to add or remove a podcast from the user's subscriptions. If the original user decides to stop subscribing to a podcast, or decides to subscribe to a new podcast, the recipient of the podcast list will not be updated unless the original user calls, e-mails, or texts the recipient with a suggestion to follow suit.

Accordingly, a need exists for systems and methods for sharing electronic content. More generally, a need exists for systems and methods for dynamically sharing audio content, such as in RSS feeds and podcasts.

SUMMARY OF THE DISCLOSURE

According to certain embodiments, methods are disclosed for enabling sharing of audio feeds. One method includes receiving, from a user over a network, a request to add an audio feed to a collection managed by the user; storing, in a database, a URL of the audio feed in relation to the collection; receiving, from the user over the network, a request to share the collection; and generating an RSS URL of the collection by searching the database for URLs of audio feeds stored in relation to the collection.

According to certain embodiments, systems are disclosed for enabling sharing of audio feeds. One system includes a data storage device storing instructions for enabling sharing of audio feeds; and a processor configured to execute the instructions to perform a method including: receiving, from a user over a network, a request to add an audio feed to a collection managed by the user; storing, in a database, a URL of the audio feed in relation to the collection; receiving, from the user over the network, a request to share the collection; and generating an RSS URL of the collection by searching the database for URLs of audio feeds stored in relation to the collection.

According to certain embodiments, a computer readable medium is disclose that stores instructions that, when executed by a computer, cause the computer to perform a method of enabling sharing of audio feeds, the method including: receiving, from a user over a network, a request to add an audio feed to a collection managed by the user; storing, in a database, a URL of the audio feed in relation to the collection; receiving, from the user over the network, a request to share the collection; and generating an RSS URL of the collection by searching the database for URLs of audio feeds stored in relation to the collection.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 4C depicts another schematic diagram of an exemplary page of an application for sharing electronic content, such as RSS and podcast feeds, according to an exemplary embodiment of the present disclosure;

FIG. 4D depicts another schematic diagram of an exemplary page of an application for sharing electronic content, such as RSS and podcast feeds, according to an exemplary embodiment of the present disclosure;

FIG. 4E depicts another schematic diagram of an exemplary page of an application for sharing electronic content, such as RSS and podcast feeds, according to an exemplary embodiment of the present disclosure; and FIG. 4F depicts another schematic diagram of an exemplary page of an application for consuming shared electronic content, such as RSS and podcast feeds, according to an exemplary embodiment of the present disclosure.

DESCRIPTION OF THE EMBODIMENTS

Figure 1:
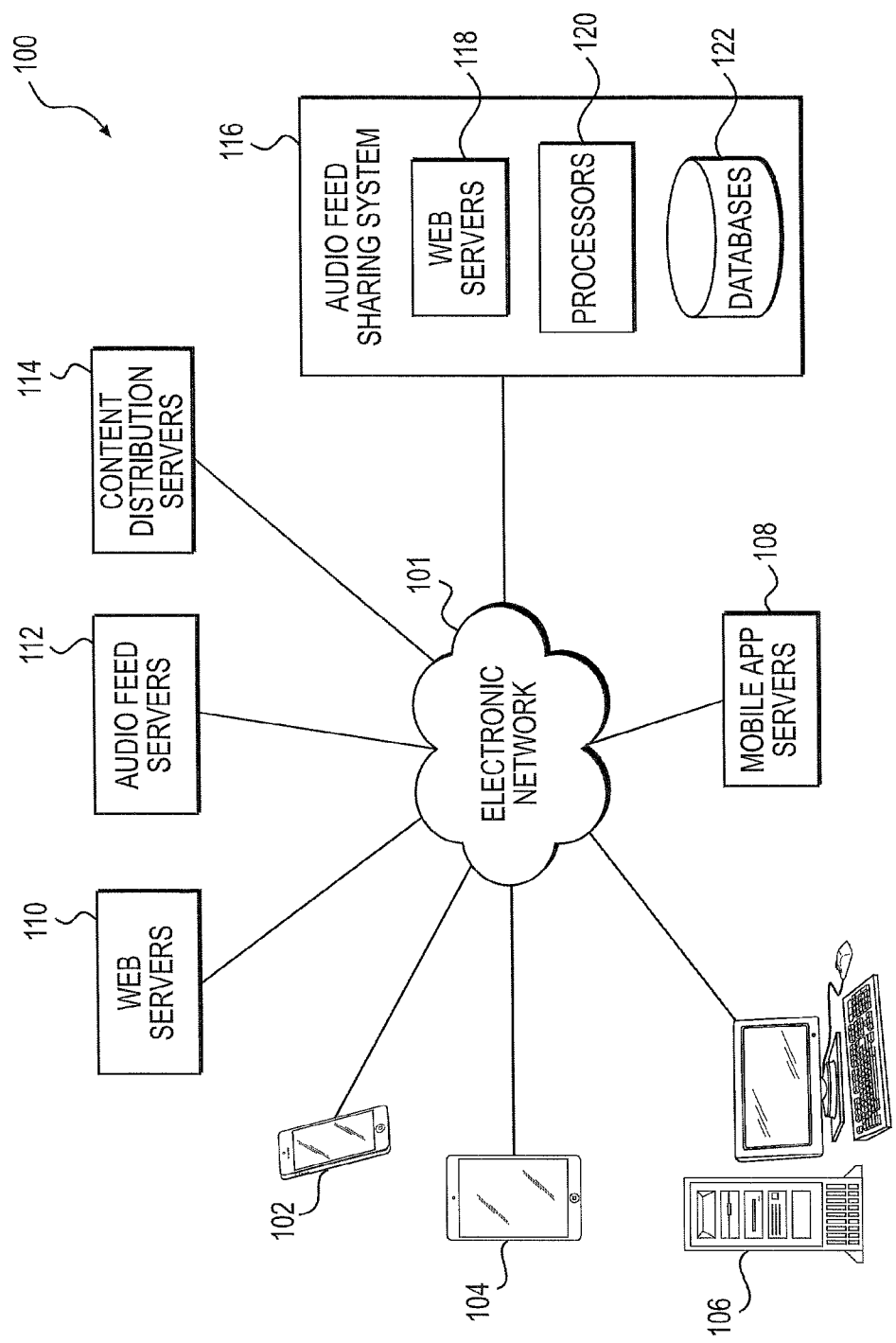
FIG. 1 is a schematic diagram of an environment in which electronic content, such as RSS and podcast feeds, may be shared, according to an exemplary embodiment of the present disclosure.

Reference will now be made in detail to the exemplary embodiments of the disclosure, examples of which are illustrated in the accompanying drawings. Wherever possible, the same reference numbers will be used throughout the drawings to refer to the same or like parts.

The present disclosure describes systems and methods for sharing electronic content, such as RSS feeds and podcasts, using a sharing application installed on a computer or mobile device. In particular, the presently-disclosed embodiments describe systems and methods for generating collections of audio feeds, such as podcasts, generating links to the collections, and sharing the links to the collections with a user's social contacts or other third parties over the Internet, thereby greatly improving users' options for dynamically sharing podcast collections assembled from diverse publishers. The presently-disclosed embodiments also describe systems and methods for identifying audio advertisements for inserting into collections of podcasts, by matching advertisement content with content of the podcasts in the collections.

In one embodiment of the disclosed methods, a user may be listening to or otherwise identify a podcast using their normal podcasting app, i.e., "podcatcher," such as, for example, "Beyond Pod" or "Dogcatcher." Once the user finds a podcast they like and would like to share with someone else, they may use the "share" functionality already built into their podcatching app. In one embodiment, the method may use a podcatcher's or mobile operating system's "intent" functions. For example, when the sharing application is installed on an Android device, the sharing application may register to the operating system's "share" intent, so that when the share intent is triggered by the user, the sharing application can come to the foreground and make use of the intent. The sharing application may obtain the URL to the MP3 of the audio file from the intent, and the user can edit by hand the title and description of the podcast, and choose which user defined "collection" the podcast will be added to. For example, a user might have a collection dedicated to technology themed podcasts and add interesting tech podcasts to that collection. Once the user finishes entering in the info for the podcast, the sharing application may call a web service on the sharing application server to save the podcast to the collection. Once the user has a collection of podcasts they want to share, the sharing application may have a share button that will open up an Android share intent with a URL for that particular collection in a standard RSS format. This collection URL may be emailed to another user so they can subscribe to that particular collection in their podcatching app of choice. The collection URL may point to the sharing application server, and call a script that searches the sharing application database for all the podcasts that belong to that collection, and return them formatted in standard RSS.

In another embodiment, once the user finds a podcast they like and would like to share with someone else, the user may instead open the sharing application, which may have a listing of all the podcasts on the device. In one embodiment, this may be made possible by a mobile application's media API that allows the sharing application to view the podcasts downloaded to the device. After a user finds the podcast in a list of podcasts in the sharing application, the user may cause the sharing application to call a rest web service to add and/or edit details to the podcast, and select a collection to add the podcast to. Once the user has created a collection of podcasts that they desire to share, the sharing application may display a share button that will enable the user to share the URL for that particular collection in an RSS format. This collection URL may then be emailed or otherwise sent to another user so they can subscribe to that particular collection in their podcasting app of choice.

In one embodiment, when an RSS URL is generated by the server, the sharing application may also perform advertising analytics to identify an advertisement targeted to the collection. The identified one or more audio ads may then be mixed into the content based on the podcast content. For example, if a user has collected a plurality of tech podcasts, the sharing application may determine a related ad, based on understandings of keywords in the podcasts' titles, descriptions, and/or content of one or more contained podcasts. In one embodiment, identifying ads to insert into collections of podcasts may involve executing contextual targeting and/or user profiling algorithms to analyze sources and content of podcasts and match them with audio ads.

FIG. 1 is a schematic diagram of an environment 100 in which electronic content may be manipulated, according to an exemplary embodiment of the present disclosure. Specifically, FIG. 1 illustrates an exemplary environment 100 including a plurality of user devices 102, 104, 106, mobile app servers 108, web servers 110, audio feed servers 112, content distribution servers 114, and an audio feed sharing system 116, all disposed in communication with an electronic network 101, such as the Internet.

In one embodiment, user devices 102, 104, 106 may be owned and used by one or more people, who may be viewers of web pages and/or consumers of multimedia content over the Internet, either through an application, mobile browser, or web browser stored on respective user devices. User devices 102, 104, 106 may include any type of electronic device configured to send and receive data, such as websites, multimedia content, and electronic advertisements, over electronic network 101. For example, each of user devices 102 may include a mobile device, smartphone, and/or personal digital assistant ("PDA") disposed in communication with electronic network 101. Each of user devices 104 may be a tablet computer or any other kind of touchscreen-enabled device disposed in communication with electronic network 101. For example, in one embodiment, each of user devices 102, 104 may be a handheld device, such as an Apple iPhone, Apple iPad, Samsung Galaxy, Amazon Kindle, Microsoft Surface, or any other equivalent or similar device. Each of user devices 106 may be a personal computer, laptop, and/or server disposed in communication with electronic network 101. Each of user devices 102, 104, 106 may have a web browser and/or mobile browser installed for receiving and displaying electronic content received from one or more of web servers 110. Each of user devices 102, 104, 106 may have an operating system configured to execute a web or mobile browser, and any type of application, such as a mobile application. In one embodiment, user devices 102, 104, 106 may be configured to download applications and/or application content from application server 108. In one embodiment, user devices 102, 104, 106 may be configured to download one or more mobile applications from a mobile application server 108, and execute those one or more applications to receive and manipulate electronic content received from one or more of web servers 110, audio feed servers 112, and content distribution servers 114.

Mobile app servers 108 may be associated with an entity that makes and distributes mobile applications, such as a sharing application consistent with the presently disclosed systems and method. In one embodiment, a mobile app server 108 may operate an "app store," where mobile applications can be purchased and downloaded.

Web servers 110 may be owned and/or operated by any entities that publish online or electronic content. For example, web servers 110 may be operated by publishers, such as online content providers, search engines, e-mail programs, RSS feed providers, magazines, e-zines, blogs, or any other online site or program that distributes online content. Thus, publishers may interact with user devices 102, 104, 106, DNS servers, ad servers, content distribution network servers, or any other servers through web servers 110 connected to electronic network 101. Thus, publishers may be able to distribute electronic content to any other entities in the environment 100 of FIG. 1.

Audio feed servers 112 may host any audio content, such as audio content in electronic files such as MP3 files, whether individually or formatted as RSS feeds or podcasts. In one embodiment, an audio feed server 112 may be associated with a single audio content publisher that publishes a podcast, such as a news network or entertainment channel. Alternatively, an audio feed server 112 may be associated with a content aggregator, such as an online media company that hosts audio content for multiple audio content publishers, i.e., news or entertainment networks.

In one embodiment, user devices 102, 104, 106 may actually receive audio files from a content distribution network, such as a large-scale network that provides load balancing, peer-to-peer distribution, content caching, and/or other advanced content distribution techniques for improving the delivery of audio files to users. Accordingly, user devices 102, 104, 106 may receive audio files from one or more content distribution servers 114 or other user devices over electronic network 101.

Audio feed sharing system 116 may include one or more web servers 118, processors 120, and/or databases 122 configured to enable systems and methods consistent with the present disclosure. In one embodiment, audio feed sharing system 116 may or may not be operated together with mobile app servers 108. In one embodiment, users may obtain a sharing application from either mobile app servers 108 or audio feed sharing system 116. Users may receive audio files or related web content from web servers 118 of audio feed sharing system 116. Processors 120 of audio feed sharing system 116 may be configured to receive, collect, and share audio files, including podcasts, by storing and organizing user and podcast data in databases 122.

Any of user devices 102, 104, 106, mobile app servers 108, web servers 110, audio feed servers 112, content distribution servers 114, and audio feed sharing system 116 may include any type or combination of computing systems, such as handheld devices, personal computers, servers, clustered computing machines, and/or cloud computing systems. In one embodiment, user devices 102, 104, 106, mobile app servers 108, web servers 110, audio feed servers 112, content distribution servers 114, and audio feed sharing system 116 may be an assembly of hardware, including a memory, a central processing unit ("CPU"), and/or optionally a user interface. The memory may include any type of RAM or ROM embodied in a physical storage medium, such as magnetic storage including floppy disk, hard disk, or magnetic tape; semiconductor storage such as solid state disk (SSD) or flash memory; optical disc storage; or magneto-optical disc storage. The CPU may include one or more processors for processing data according to instructions stored in the memory. The functions of the processor may be provided by a single dedicated processor or by a plurality of processors. Moreover, the processor may include, without limitation, digital signal processor (DSP) hardware, or any other hardware capable of executing software. The user interface may include any type or combination of input/output devices, such as a display monitor, touchpad, touchscreen, microphone, camera, keyboard, and/or mouse.

As described above, the presently disclosed systems and methods may be configured to enable users to share RSS feeds, audio feeds, and/or audio files, including so-called "podcasts," using computers or mobile devices equipped with a sharing application. Specifically, users may share podcasts between user devices 102, 104, 106 by using a sharing application downloaded from one of mobile app servers 108 and audio feed sharing system 116. In one embodiment, the user sharing one or more podcasts may use the sharing application, whereas the user receiving the shared podcasts may receive the shared podcasts using a standard podcatcher application.

Figure 2:
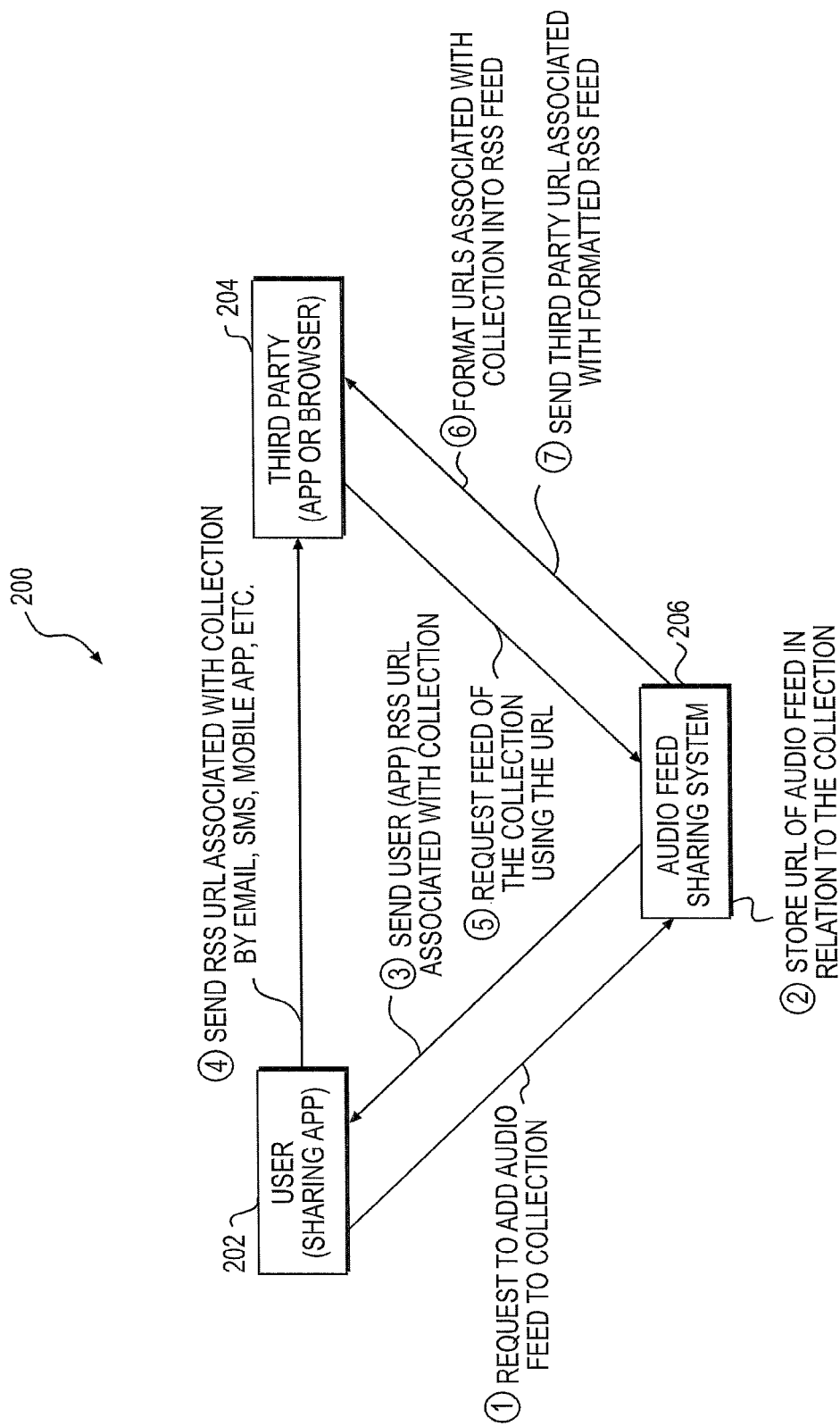
FIG. 2 depicts a flow diagram of a process for sharing electronic content, such as RSS and podcast feeds, according to an exemplary embodiment of the present disclosure.

FIG. 2 depicts a flow diagram of a process for sharing electronic content, such as RSS and podcast feeds, according to an exemplary embodiment of the present disclosure. Specifically, FIG. 2 depicts a method 200 for a user 202 to share electronic content with a third party 204, with the assistance of audio feed sharing system 206. As shown in FIG. 2, the user 202 who desires to share audio content may be using a sharing application, whereas the third party 204 may receive shared audio content while using either the sharing application, or a standard podcatcher or mobile or web browser. As shown in FIG. 2, method 200 may begin with user 202 requesting to add an audio feed to a collection (step 1). The user 202 may at this step create a new collection, or may request to add an audio feed to an existing collection. The term "audio feed" may include any compilation of audio content, including an RSS feed of audio files and/or one or more podcasts. The collection may be a compilation or aggregate of a plurality of audio feeds, RSS feeds, and/or podcasts. The collection may be created and defined by the user 202. For example, user 202 may create a single collection of "favorite" audio fees. Alternatively, user 202 may create a plurality of collections of audio feeds, with each collection being directed to a different subject matter. For example, user 202 might create a sports-related collection, a news-related collection, and a technology-related collection. In one embodiment, user 202 may request to create a collection or add an audio feed to an already created collection through a sharing application installed on the user's mobile device and/or computer. The sharing application may be configured to communicate the user's request to audio feed sharing system 206 through the device's or computer's connection to the Internet. In one embodiment, the sharing application may send to the audio feed sharing system 206 the podcast URL, podcast title, podcast description, and the name of the collection to which the user desires to add the podcast.

Upon receiving a request from the user to add an audio feed, e.g., podcast, to a new or existing collection, the audio feed sharing system 206 may store a URL of the audio feed in relation to the collection (step 2). For example, if a user requests to add "Engadget's" podcast to the user's "Tech" collection, then audio feed sharing system 206 may save the URL of Engadget's podcast in a data field of databases 122 associated with the user's Tech collection. Thus, databases 122 of audio feed sharing system 206 may contain a plurality of entries, each entry for a different collection stored for a different user, and each collection having stored in relation to it a plurality of podcast URLs for podcasts each user desired to include in the respective collection. In one embodiment, databases 122 may be indexed by collection name or collection ID, which may enable useful searching for podcasts stored in relation to a particular collection.

Audio feed sharing system 206 may then send the user, e.g., through the sharing application, an RSS URL generated for the collection (step 3). In one embodiment, processors 120 of audio feed sharing system 206 may search databases 122 for any podcasts stored in relation to a requested collection name or collection ID. Processors 120 of audio feed sharing system 206 may then generate an RSS URL using, e.g., JavaServer Pages, or any other suitable server side technology, to loop through each podcast URL stored in relation to the requested collection, and convert each found podcast URL into an RSS feed item having a description and title. In one embodiment, the podcasts stored in relation to a collection, and incorporated into an RSS feed of podcasts, may be hosted by a plurality of different publishers or creators.

Having received an RSS URL generated for the collection from the audio feed sharing system 206, user 202 may then send the RSS URL associated with the collection to a third party 204, such as by e-mail, SMS, the sharing application, or any other mobile application or other means for transmitting a URL to another person. In one embodiment, third party 204 may be a family member, friend, or colleague of the user 202, such as a social media contact. As shown in FIG. 2, while user 202 may be using the sharing application to create and share podcast collections, the third party 204 may be using the same sharing application or alternatively a standard podcatcher or a mobile or web browser.

Upon receiving the RSS URL generated for the collection, the third party 204 may then use the same sharing application or alternatively a standard podcatcher or mobile or web browser to request the feed of the collection using the received RSS URL (step 5). In one embodiment, the RSS URL may point to a web server 118 of audio feed sharing system 116. One or more processors 120 of audio feed sharing system 116 may then format the plurality of podcast URLs associated with the requested RSS URL of the collection (step 6), and send the third party the URLs associated with the formatted RSS feed (step 7). For example, in one embodiment, audio feed sharing system 116 may generate the RSS feed on-demand and send the RSS feed to the third-party's device, such as to a podcatching application on the third party's device. The third party recipient may therefore be able to download all of the audio files associated with the collection, such as from the original podcast publishers associated with each podcast in the shared collection. The third party may also download updates to the collection, based on whether the original user 202 adds or removes various podcasts from the collection. For example, each time the third party calls the RSS feed, the audio feed sharing system 116 may generate an up-to-date feed of contained podcasts based on what is returned from a search of the database.

In one embodiment, audio feed sharing system 116 may be configured to analyze podcasts stored in relation to a particular collection, and then identify one or more audio advertisements targeted to those podcasts. For example, processors 120 of audio feed sharing system 116 may obtain keywords from titles and/or descriptions of podcasts, and also obtain keywords from speech-to-text recognition of the content of the podcasts. Based on keywords extracted from podcast metadata and/or the podcasts themselves, the audio feed sharing system 116 may then identify advertisements most relevant to those keywords. For example, if audio feed sharing system 116 determines that a collection contains mostly tech-related podcasts, then it may identify one or more advertisements targeted to people who consume tech-related content.

Figure 3:
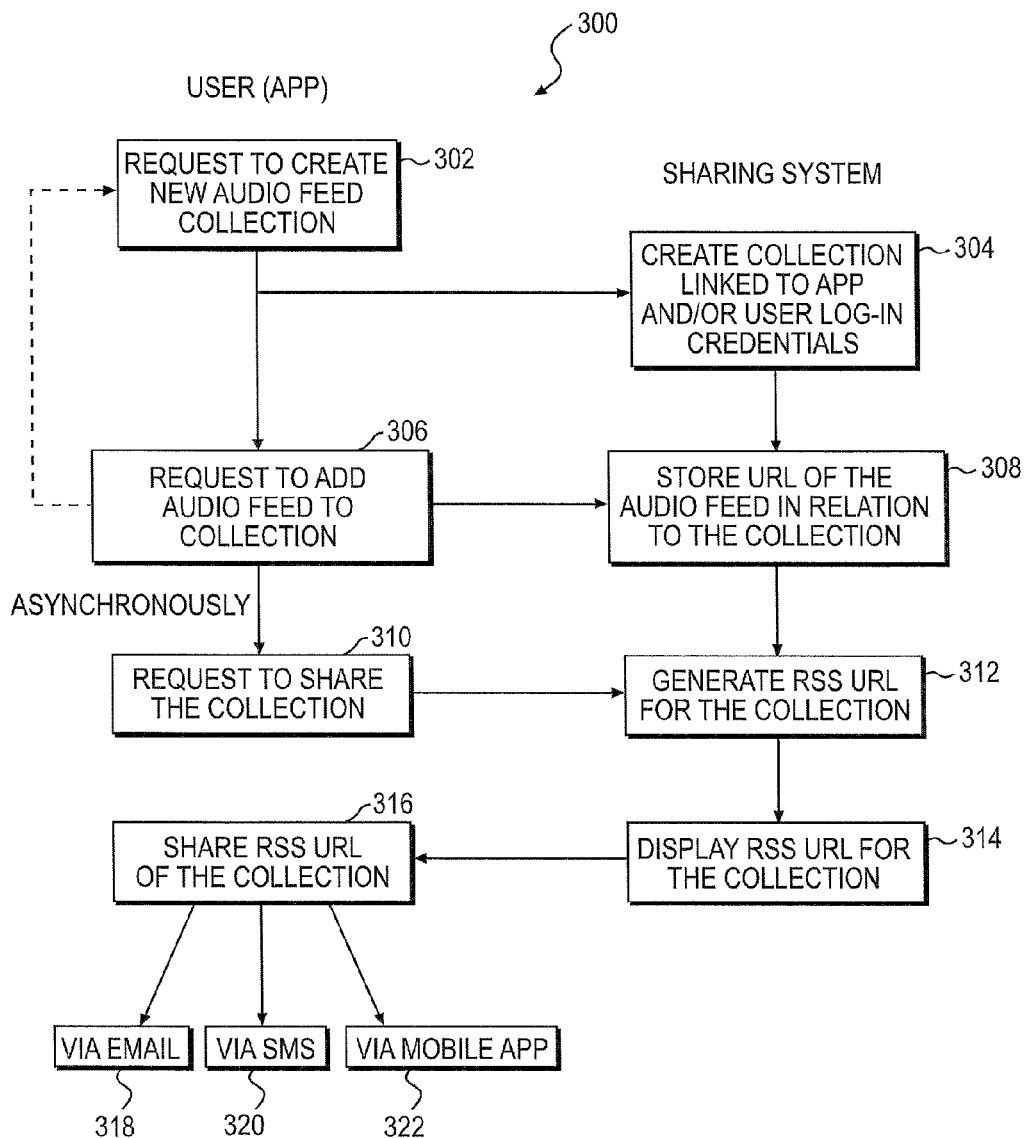
FIG. 3 depicts another flow diagram of a process for sharing electronic content, such as RSS and podcast feeds, according to an exemplary embodiment of the present disclosure.

FIG. 3 depicts another flow diagram of a method 300 for sharing electronic content, such as RSS and podcast feeds, according to an exemplary embodiment of the present disclosure. As shown in FIG. 3, method 300 may include a user requesting to create a new audio feed collection (step 302), such as with a sharing application installed on the user's computer 106 or mobile device 102, 104. In response, the sharing system, such as audio feed sharing system 116, may create a collection linked to the user's sharing application and/or user log-in credentials (step 304). For example, the sharing system may generate a new data record including a collection name or ID, and the name or ID of the user who requested creation of the collection. The user may then request to add an audio feed to a collection (step 306). If the collection has not already been created, the method may proceed to steps 302, 304, by which the user and sharing system may interact to create the desired new collection. In one embodiment, the user may request to add an audio feed to a collection, by accessing a podcast or other audio file in the user's computer or mobile device, either through the sharing application or another application stored on the device. In one embodiment, the user may request to add an audio feed by opening the sharing application and selecting the audio feed from a list of all audio feeds stored on the user's device, e.g., using a function of the device's operating system. Alternatively, or additionally, the user may have linked the sharing application to the device's sharing functionality. As a result, when the user is viewing or listening to an audio feed in a standard podcatcher, the user may select an option to share the audio feed through the linked sharing application.

The sharing system may then store the URL of the audio feed, which was requested to be added, in relation to the collection (step 308). It will be appreciated that the user may request to add any desired number of audio feeds, e.g., podcasts, to a collection, and may create and update any desired number of podcast collections. The creation and maintenance of a collection may be an ongoing process, and users may continue to add and remove podcasts from one or more of their collections over time. As described above, at any time, a user may share one or more of their collections with their contacts, and recipients of those shared collections may receive updates to the user's collections by virtue of RSS updating.

Specifically, at any given time after creation of a podcast collection, i.e., asynchronously, the user may request to share a collection with a third party (step 310). For example, the user may use the sharing application to initiate sharing one or more of the user's collections with, for example, a contact stored in the user's mobile device, a social networking contact, or any other person for whom the user has contact information. Upon receiving the user's request to share a collection, the sharing application may cause the sharing system, such as audio feed sharing system 116, to generate an RSS URL associated with the collection (step 312). For example, audio feed sharing system 116 may search databases 122 for any podcasts stored in relation to a requested collection name or collection ID. Processors 120 of audio feed sharing system 206 may then generate an RSS URL using, e.g., JavaServer Pages, or any other suitable server side technology, to loop through each podcast URL stored in relation to the requested collection, and convert each found podcast URL into an RSS feed item having a description and title. The sharing system may then display the RSS URL of the collection to the user, such as through the sharing application on the user's computer or mobile device (step 314). The user may then share the RSS URL of the collection (step 316), such as by e-mail (step 318), SMS (step 320), and/or a mobile application (step 322). It will be appreciated that the user may share the RSS URL of the generated collection by any communication method through which users can share short segments of text, such as URLs.

FIGS. 4A through 4F depict screenshots of a sharing application consistent with the presently disclosed embodiments. For example, as described above, the sharing application of the screenshots may be installed on a computer 106 or mobile device 102, 104 of the user, and may be configured to communicate with audio feed sharing system 116 over the Internet. The sharing application may also facilitate interacting with other communication applications stored on the user's computer or mobile device, such as SMS client applications, e-mail client applications, podcatcher applications, and/or audio feed applications.

Figure 4B:
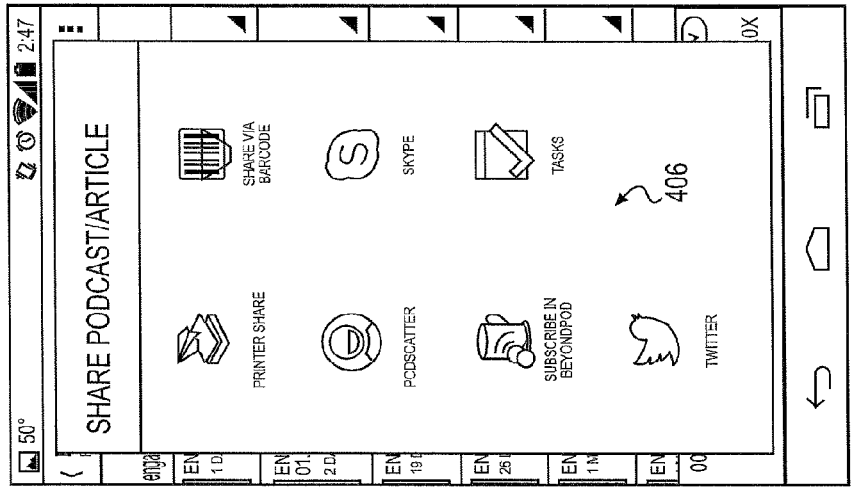
FIG. 4B depicts another schematic diagram of an exemplary page of an application for sharing electronic content, such as RSS and podcast feeds, according to an exemplary embodiment of the present disclosure.
Figure 4A:
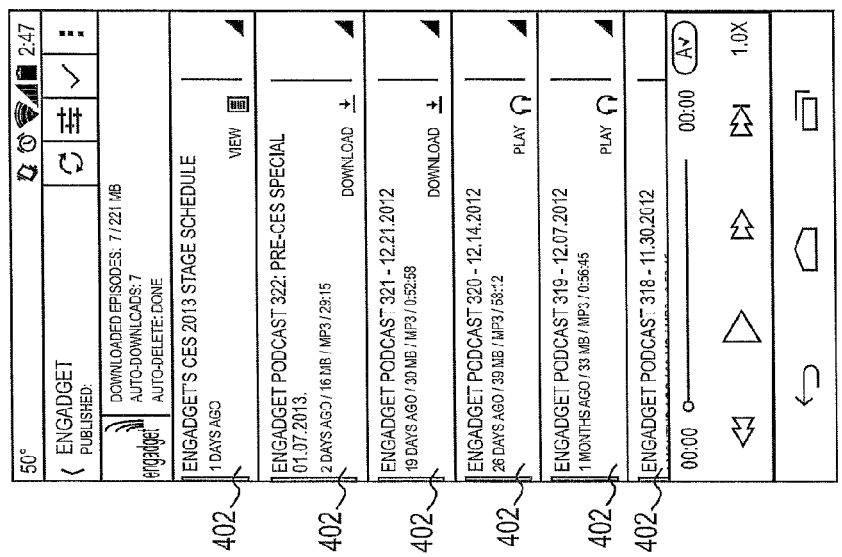
FIG. 4A depicts a schematic diagram of an exemplary page of an application for consuming electronic content, such as RSS and podcast feeds, according to an exemplary embodiment of the present disclosure.

FIG. 4A depicts a schematic diagram of an exemplary page of an application for receiving audio feeds, such as RSS and podcast feeds, according to an exemplary embodiment of the present disclosure. Specifically, FIG. 4A depicts a screenshot of an exemplary podcatcher application, with which the sharing application of the present disclosure may interact. As shown in FIG. 4A, the podcatcher app may display a plurality of audio feeds, audio files, or podcasts 402. The user may then interact with the podcatcher application to invoke a sharing mechanism native to the operating system of the user's computer or mobile device. For example, the user may ask the operating system or podcatcher application depicted in FIG. 4A to share one of the podcasts 402. In one embodiment, invoking the application's sharing functionality may cause the computer or mobile device to open an application picker dialog.

FIG. 4B depicts another schematic diagram of an exemplary page of an application picker dialog, for selecting an application to share electronic content, such as RSS and podcast feeds, according to an exemplary embodiment of the present disclosure. As shown in FIG. 4B, the operating system of the user's device may activate its native sharing functionality, which may open the operating system's application picker dialog 406. As shown, the operating system's application picker dialog 406 may invite the user to share the previously selected item (in this case, one of podcasts 402), using one of the indicated programs, such as a printer, Skype, Twitter, or "Podscatter"—the exemplary name of a sharing application consistent with the presently disclosed embodiments. At this point, the user may select the sharing application, e.g., the "Podscatter" app to add the selected podcast to a collection and/or share the collection with a third party.

Figures 4C, 4D:
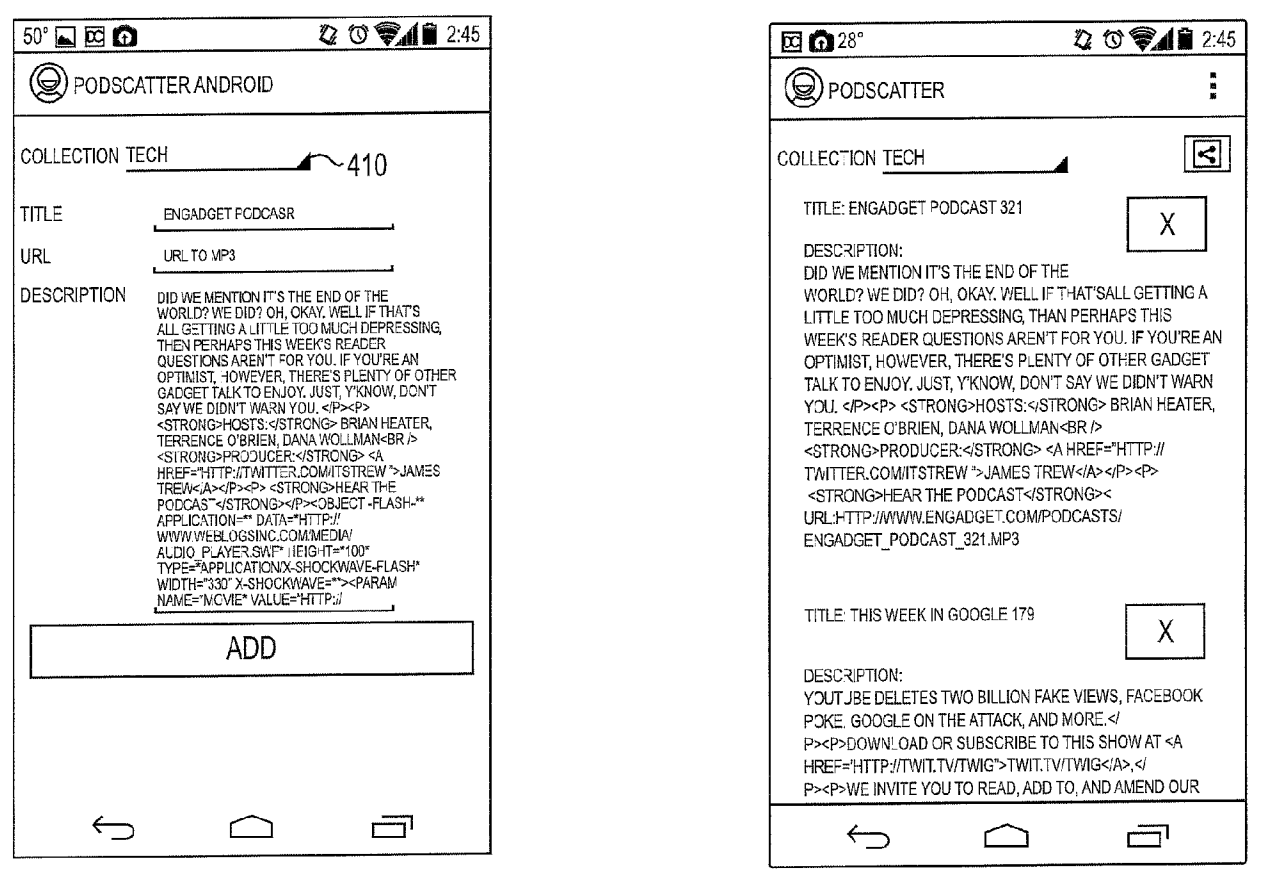

The selected sharing application, e.g., "Podscatter," may open as shown in FIG. 4C, which depicts another schematic diagram of an exemplary page of an application for sharing electronic content, such as RSS and podcast feeds. As shown in FIG. 4C, the sharing application may be automatically populated with the title, URL, and description of the podcast 402 that the user previously selected, and the user may be given an opportunity to edit the title or description of the podcast. In addition, the user may be provided with a drop down menu 410 or other user element to select one of a plurality of available collections to which to add the selected podcast 402. In one embodiment, drop down menu 410 may include an option to create and name a new collection. After making any desired edits to the podcast title and description, and selecting a desired collection to add the podcast to, the user may proceed with adding the selected podcast to the desired collection.

Once the user has requested to add the desired podcast 402 to the desired collection, audio feed sharing system 116 may proceed with storing the collection, podcast, and user data in databases 122 according to the methods described above. The audio feed sharing system 116 may also interact with the user's sharing application to display the podcasts associated with the recently updated collection. For example, FIG. 4D depicts another schematic diagram of an exemplary page of an application for sharing electronic content, such as RSS and podcast feeds, according to an exemplary embodiment of the present disclosure. Specifically, FIG. 4D depicts how, after adding the desired podcast, e.g., "Engadget Podcast 321," to the desired collection, e.g., "Tech," the sharing application may display a page of the collection and any podcasts (e.g., title, URL, description, etc.) stored on the sharing system's server in relation to the user's indicated collection.

As described above, a user may on occasion desire to share one or more of the user's created podcast collections. FIG. 4E depicts another schematic diagram of an exemplary page of an application for sharing electronic content, such as RSS and podcast feeds, according to an exemplary embodiment of the present disclosure. Specifically, FIG. 4E depicts how the user may share a collection with a third party by sharing an RSS URL generated for the collection. In one embodiment, the user may have initiated sharing through the sharing application by selecting a sharing button or function native to the operating system of the user's device. For example, the user may have initiated a mechanism to share the collection by e-mail, SMS, a social network, and/or any other communications application. As shown in FIG. 4E, the user may compose an e-mail to a friend including the RSS URL 414 of the collection desired to be shared. The user may similarly share the RSS URL 414 by SMS, a social network, or any other desired communications medium.

The recipient of the RSS URL 414 may then use any desired podcatcher application, such as one native to their device or computer, or any other popular podcatcher to download and listen to all of the podcasts included in the shared podcast collection. FIG. 4F depicts a schematic diagram of an exemplary page of a podcatching application, according to an exemplary embodiment of the present disclosure. For example, the friend who received the email from the user can then open up the RSS feed in their favorite podcatching application, and then selectively download and listen to one or more of the included podcasts 416. As described above, because the audio feeds or podcasts are shared through the presently disclosed sharing application, systems, and methods, the shared collection may include podcasts created and hosted by different publishers. For example, as shown in FIG. 4F, one podcast 416 may be published by "Engadget" while the other podcast 416 is published by "Google."

In addition, as described above, the audio feed sharing system 116 may identify and include in a collection one or more audio ads targeted to the content of the collection. Accordingly, as shown in FIG. 4F, the shared "Tech" collection may include an advertisement 418 that is relevant to the shared collection and likely to be of interest to the recipient of the collection and therefore value to the advertiser. In one embodiment, the advertisement 418 may be an image file displayed in line with podcasts displayed in the collection. In another embodiment, the advertisement 418 may be an audio file that is played in series with other podcasts in the collection. For example, the advertisement may be an MP3 file hosted at a particular URL, and the advertisement may be selected and hosted by any suitable third party advertising network: In one embodiment, an injected audio ad may include a title, URL to media, and description, like other items in the RSS feed.

The presently disclosed sharing application, methods, devices, and systems may advantageously improve the sharing of audio feeds, such as RSS audio feeds and podcasts. Specifically, users may add any desired podcasts from across multiple publishers to a single collection, and may create, modify, and delete collections tailored to specific subject matter. Users may therefore easily share dynamic podcasts with their contacts, where the dynamic podcasts may automatically update based on changes the user makes to the collection and updates received from the podcasts included in the collection. In addition to improving the user experience with podcasts, the presently disclosed sharing application, methods, devices, and systems may create a new vehicle for generating advertising revenue.

While the presently disclosed sharing application, methods, devices, and systems are described with exemplary reference to mobile applications and to sharing podcasts, it should be appreciated that the presently disclosed embodiments may be applicable to any environment, such as a desktop or laptop computer, an automobile entertainment system, a home entertainment system, etc. Also, the presently disclosed embodiments may be applicable to any type of content, such as text content or video content.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for enabling sharing of audio feeds, the method including:
   receiving, from a user over a network, a request to add an audio feed to a collection managed by the user;
   storing, in a database, a location indicator of the audio feed in relation to the collection;
   receiving, from the user over the network, a request to share the collection; and
   generating a sharable location indicator of the collection by searching the database for one or more location indicators of audio feeds stored in relation to the collection.

2. The method of claim 1, further comprising:
   adding to the collection an advertisement based on content of one or more audio feeds stored in relation to the collection.

3. The method of claim 1, wherein the audio feed is a podcast.

4. The method of claim 1, further comprising:
   receiving, from the user over the network, a request to add a second audio feed to the collection, wherein the second audio feed has a subject matter similar to a subject matter of the first audio feed.

5. The method of claim 1, further comprising:
   receiving, from the user over the network, a request to add a second audio feed to the collection, wherein the second audio feed is hosted by an entity different from an entity that hosts the first audio feed.

6. The method of claim 1, further comprising:
   receiving, from the user over the network, a request to create a collection of audio feeds, the request including at least one of a name of the collection and ID of the collection.

7. The method of claim 1, further comprising:
   displaying a list of audio feeds stored in relation to the collection.

8. The method of claim 1, further comprising:
   displaying to the user an RSS URL of the collection by searching the database for URLs of audio feeds stored in relation to the collection.

9. The method of claim 1, further comprising:
   enabling the user to send a third party an RSS URL of the collection by searching the database for URLs of audio feeds stored in relation to the collection.

10. A system for enabling sharing of audio feeds, the system including:
   a data storage device storing instructions for enabling sharing of audio feeds;
   a processor configured to execute the instructions to perform a method including:
      receiving, from a user over a network, a request to add an audio feed to a collection managed by the user;
      storing, in a database, a location indicator of the audio feed in relation to the collection;
      receiving, from the user over the network, a request to share the collection; and
      generating a sharable location indicator of the collection by searching the database for one or more location indicators of audio feeds stored in relation to the collection.

11. The system of claim 10, wherein the processor is configured to execute the instructions to perform the method further including:
   adding to the collection an advertisement based on the content of one or more audio feeds stored in relation to the collection.

12. The system of claim 10, wherein the audio feed is a podcast.

13. The system of claim 10, wherein the processor is configured to execute the instructions to perform the method further including:
   receiving, from the user over the network, a request to add a second audio feed to the collection, wherein the second audio feed has a subject matter similar to a subject matter of the first audio feed.

14. The system of claim 10, wherein the processor is configured to execute the instructions to perform the method further including:
   receiving, from the user over the network, a request to add a second audio feed to the collection, wherein the second audio feed is hosted by an entity different from an entity that hosts the first audio feed.

15. The system of claim 10, wherein the processor is configured to execute the instructions to perform the method further including:
   receiving, from the user over the network, a request to create a collection of audio feeds, the request including at least one of a name of the collection and ID of the collection.

16. The system of claim 10, wherein the processor is configured to execute the instructions to perform the method further including:
   displaying to the user an RSS URL of the collection by searching the database for URLs of audio feeds stored in relation to the collection.

17. The system of claim 10, wherein the processor is configured to execute the instructions to perform the method further including:
   enabling the user to send a third party an RSS URL of the collection by searching the database for URLs of audio feeds stored in relation to the collection.

18. A non-transitory computer-readable medium storing instructions that, when executed by a computer, cause the computer to perform a method of enabling sharing of audio feeds, the method including:
   receiving, from a user over a network, a request to add an audio feed to a collection managed by the user;
   storing, in a database, a location indicator of the audio feed in relation to the collection;
   receiving, from the user over the network, a request to share the collection; and
   generating a sharable location indicator of the collection by searching the database for one or more location indicators of audio feeds stored in relation to the collection.

19. The computer-readable medium of claim 18, further comprising:
   adding to the collection an advertisement based on content of one or more audio feeds stored in relation to the collection.

20. The computer-readable medium of claim 18, wherein the audio feed is a podcast.

* * * * *